US011747587B2

(12) United States Patent
Huang et al.

(10) Patent No.: US 11,747,587 B2
(45) Date of Patent: Sep. 5, 2023

(54) VOICE COIL MOTOR DEVICES FOR AUTO FOCUSING OR ZOOMING

(71) Applicant: VASSTEK INTERNATIONAL CORP., Miaoli County (TW)

(72) Inventors: Chih-Ming Huang, Miaoli County (TW); Chieh-Hui Hsu, Miaoli County (TW)

(73) Assignee: VASSTEK INTERNATIONAL CORP.

( * ) Notice: Subject to any disclaimer, the term of this patent is extended or adjusted under 35 U.S.C. 154(b) by 242 days.

(21) Appl. No.: 17/166,277

(22) Filed: Feb. 3, 2021

(65) Prior Publication Data

US 2021/0247588 A1 Aug. 12, 2021

(30) Foreign Application Priority Data

Feb. 6, 2020 (TW) .................. 109103987

(51) Int. Cl.
*G02B 7/09* (2021.01)
*H02K 11/215* (2016.01)
*H02K 41/035* (2006.01)

(52) U.S. Cl.
CPC ............. *G02B 7/09* (2013.01); *H02K 11/215* (2016.01); *H02K 41/0356* (2013.01)

(58) Field of Classification Search
CPC .. G03B 5/00; G03B 13/36; G03B 2205/0007; G03B 2205/0053; G03B 2205/0069; G03B 3/02; G03B 3/10; G03B 5/04; G03B 30/00; G02B 7/021; G02B 7/08; G02B 7/09; G02B 7/10; G02B 9/62; G02B 13/001; G02B 13/0065; G02B 27/646; H04N 5/2253; H04N 5/2254; H04N 5/2257; H04N 5/23287; H02K 11/33; H02K 11/215; H02K 41/0356
(Continued)

(56) References Cited

U.S. PATENT DOCUMENTS

| 5,296,988 | A | * | 3/1994 | Fujino | ................ | H02K 41/0356 |
| | | | | | | 360/110 |
| 2022/0201166 | A1 | * | 6/2022 | Roh | .......................... | G03B 3/10 |
| 2022/0256058 | A1 | * | 8/2022 | Kim | ..................... | G02B 27/646 |

FOREIGN PATENT DOCUMENTS

| CN | 204129406 | 1/2015 |
| CN | 209002076 | 6/2019 |

(Continued)

*Primary Examiner* — Marin Pichler
(74) *Attorney, Agent, or Firm* — Allen, Dyer, Doppelt + Gilchrist, PA (57) ABSTRACT

The present invention is related to a voice coil motor device for auto focusing or zooming, mainly includes a base, a movable magnetic path component, two elongate guide rods and a plurality of balls. The base has a first receiving slot and two second receiving slots. The movable magnetic path component is configured in the first receiving slot and has a lens carrier installing thereon a lens, wherein the lens carrier has a bottom surface having a plurality of first abutting structures. The two elongate guide rods are mounted in the two second receiving slots respectively. The plurality of balls are respectively mounted between the plurality of first abutting structures and the two elongate guide rods, wherein the plurality of balls facilitate a movement of the movable magnetic path component in the first receiving slot, for performing an auto focusing or zooming of the lens.

7 Claims, 10 Drawing Sheets

(58) Field of Classification Search
USPC ....... 359/359, 911, 554, 555, 557, 811, 813,
359/814, 824, 872, 877
See application file for complete search history.

(56) References Cited

FOREIGN PATENT DOCUMENTS

| | | |
|---|---|---|
| CN | 209375773 | 9/2019 |
| TW | 201421100 | 6/2014 |

* cited by examiner

VOICE COIL MOTOR DEVICES FOR AUTO FOCUSING OR ZOOMING

CROSS-REFERENCE TO RELATED APPLICATION AND CLAIM OF PRIORITY

This application claims the benefit of Taiwan Patent Application No. 109103987, filed on Feb. 6, 2020, at the Taiwan Intellectual Property Office, the disclosures of which are incorporated herein in their entirety by reference.

FIELD OF THE INVENTION

The present invention is related to a voice coil motor device, particularly a voice coil motor device, which can be applied in handheld devices, for auto focusing or zooming.

BACKGROUND OF THE INVENTION

In order to perform a precise positioning control on a head arm of a hard disk or a set of lens, a voice coil motor (VCM) is usually adopted to move the head arm of the hard disk or the set of lens. For the mechanism of the voice coil motor, it is mainly that a coil is placed in a magnetic path containing a permanent magnet.

If optical focusing or zooming is required, it is necessary to facilitate a lens carrier (usually carrying a lens) of a movable magnetic path component (not shown) to move straight up and down along a plurality of guide shafts under the interaction of the main magnetic fluxes provided by a magnetic sensing element (not shown) of the movable magnetic path component and a set of coils of a permanent circuit component (not shown) of the voice coil motor after powering the set of coils of the permanent circuit component.

During the movement, based on a magnetic attraction force of a magnetic sensing element to a guide shaft already abutted against a through hole, the guide shaft will be close to and contact a hole wall of the through hole, and two guide metals contact the hole wall of the through hole at a single point respectively when viewed from a top of the voice coil motor. No matter whether the axes of the guide shaft slide in the through hole or in a plane, from the perspective of three-dimensional space, the guide shaft is in line contact with the hole wall of the through hole, resulting in greater friction. Thus, more power is needed to drive the movable magnetic path component.

Furthermore, in addition to the situation that the lens carrier of the movable magnetic path component moves straight up and down along the plurality of guide shafts, for a periscopic camera lens that requires horizontal movement for focusing or zooming, there is also a similar problem of excessive friction.

SUMMARY OF THE INVENTION

In accordance with an aspect of the present invention, a voice coil motor device for auto focusing or zooming is provided. In the voice coil motor device, a movable magnetic path component, a rollable structure and a base abut against one another by the magnetic attraction force of the magnetic sensing elements and the elongate guide rods, and there are three point contacts among the movable magnetic path component, the base and the roll able structure. In this way, the movable magnetic path component can be moved under the minimum friction force such that focusing or zooming operations can be achieved. Furthermore, an elongate guide rod of a metal material in the voice coil motor device can increase the movement travel of the movable magnetic path component to realize optical focusing or zooming operations.

To achieve the purpose as mentioned above, the voice coil motor device for auto focusing or zooming includes a base having a first receiving slot and two second receiving slots; a movable magnetic path component configured in the first receiving slot and having a lens carrier installing thereon a lens, wherein the lens carrier has a bottom surface having a plurality of first abutting structures; two elongate guide rods mounted in the two second receiving slots respectively; and a plurality of balls respectively mounted between the plurality of first abutting structures and the two elongate guide rods, wherein the plurality of balls facilitate a movement of the movable magnetic path component in the first receiving slot, for performing an auto focusing or zooming of the lens.

In accordance with a further aspect of the present invention, the present invention provides a voice coil motor device, wherein the voice coil motor device includes a base having a first receiving slot, two sides and two contact lines respectively along the two sides; a carrying structure configured in the first receiving slot, carrying a lens and having two side bottoms, wherein each the side bottom has a first contact plane; two second contact planes configured on the two sides or the two side bottoms respectively; and four balls each configured among the respective contact line, the respective side bottom and the two second contact planes, so that each ball has a respective single-point contact with any of the respective contact line, the first contact plane and the two second contact planes, and the carrying structure moves in the first receiving slot via the four balls, for facilitating an auto focusing or zooming of the lens.

BRIEF DESCRIPTION OF THE DRAWINGS

The details and advantages of the present invention will become more readily apparent to one ordinarily skilled in the art after reviewing the following detailed descriptions and accompanying drawings.

FIG. 1b is a schematic diagram of the structure of the voice coil motor device of FIG. 1a.

FIG. 1c is an exploded view of the voice coil motor device for auto focusing or zooming of FIG. 1a.

FIGS. 2a and 2b show an embodiment of the voice coil motor device according to the present invention, wherein FIG. 2b is a cross sectional view of the configuration of a rollable structure of the voice coil motor device of FIG. 2a.

DETAILED DESCRIPTION OF THE PREFERRED EMBODIMENT

Figure 1A:
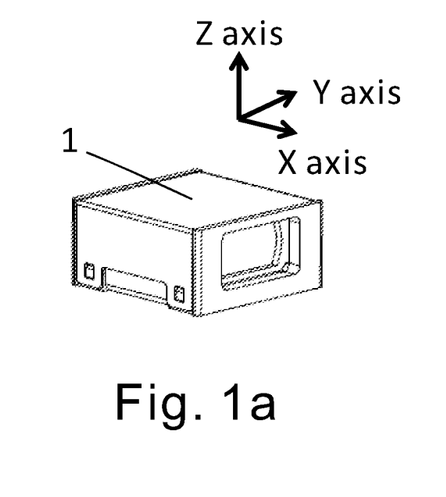
FIG. 1a is a schematic diagram of a voice coil motor device for auto focusing or zooming after assembly according to the present invention.
Figure 1B:
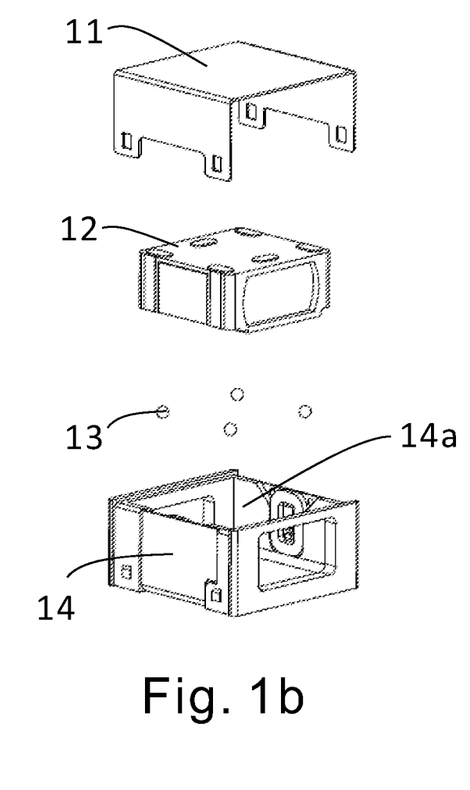
Figure 1C:
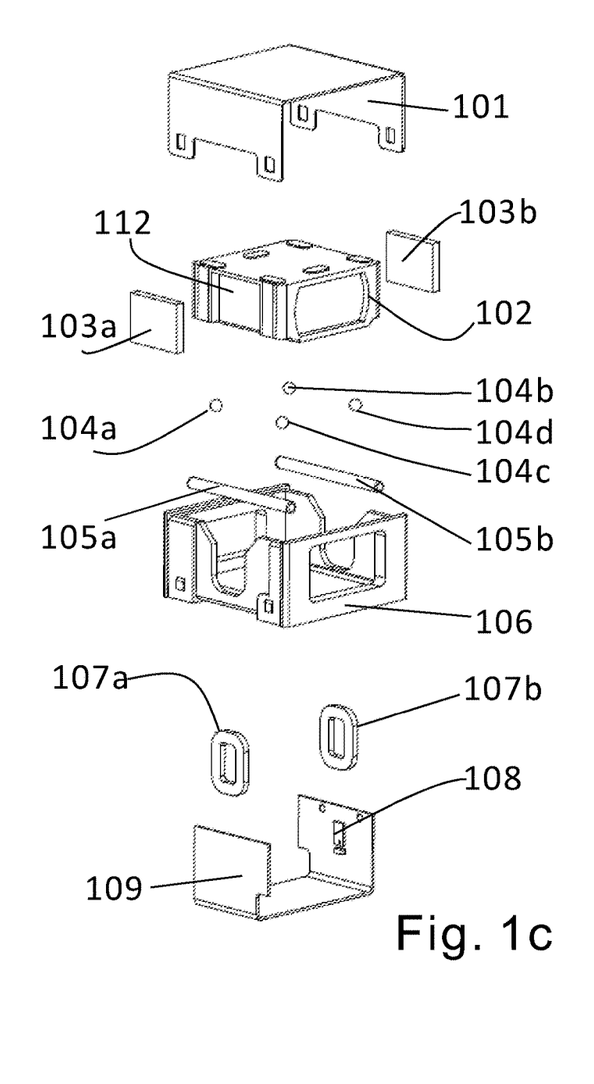

FIG. 1a is a schematic diagram of a voice coil motor device 1 for auto focusing or zooming after assembly according to the present invention, wherein for clearly presenting the position relationships among the components of the voice coil motor device 1 of the present invention hereinafter, X, Y and Z axial directions for three dimensional space are defined; FIG. 1b is a schematic diagram of the structure of the voice coil motor device 1 of FIG. 1a; and FIG. 1c is an exploded view of the voice coil motor device 1 of FIG. 1a. According to an embodiment of the present invention, as shown in FIGS. 1a~1c, the voice coil motor device 1 includes a protective enclosure 11, 101, a movable magnetic path component 12, a ball set 13 and a mounting component 14. The movable magnetic path component 12, which is also called as a carrying structure, includes a lens carrier 102 and magnetic sensing elements 103a, 103b, wherein the magnetic sensing elements 103a, 103b are rigidly connected to two side walls 112 of the lens carrier 102, respectively; and the lens carrier 102 is used to carry a set of lens (not shown). The mounting component 14 includes a base 106, cylindrical guide rods 105a, 105b mounted in the base 106 and a circuit device component 109. In another embodiment, the shape of the guide rod of the present invention is not limited to being cylindrical and can be elongate guide rods with any elongate shape. The circuit device component 109 includes a printed circuit board (not shown), a set of coils 107a, 107b, a Hall sensor 108. The balls 104a, 104d, the cylindrical guide rods 105a, 105b and abutting structures (as shown in FIGS. 2a, 2b and 3~5) constitute a rollable structure.

As shown in FIGS. 1b~1c, the circuit device component 109 is configured in a way that the coils 107a, 107b are mounted in the respective grooves of the base elevations 14a of the base 106 according to the positions of the coils 107a, 107b and face the respective magnetic sensing elements 103a, 103b of the movable magnetic path component 12. After the assembly is completed, there is a predetermined distance between the coil 107a and the magnetic sensing element 103a, and there is a predetermined distance between the coil 107b and the magnetic sensing element 103b. The Hall element 108 can be used as a position sensor for detecting the travelling position of the movable magnetic path component 12, and under the control of external signals, the lens mounted on the lens carrier 102 can be moved to a specified position so as to achieve optical focusing or zooming.

Figure 2A:
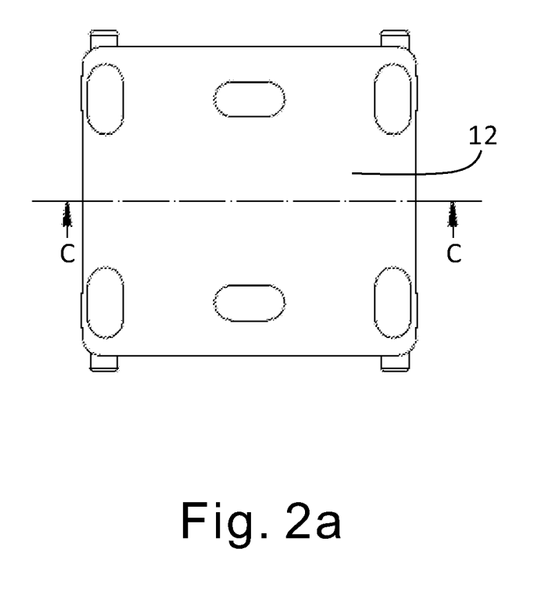
FIG. 2a is a top view of the voice coil motor device.
Figure 2B:
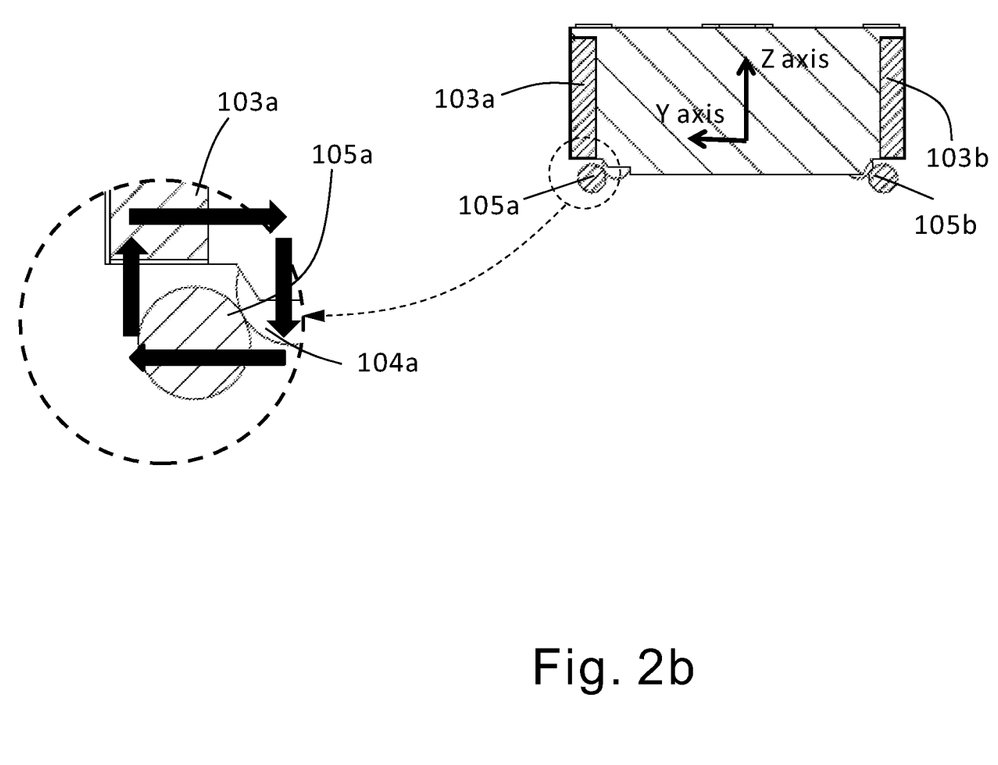
Figure 3:
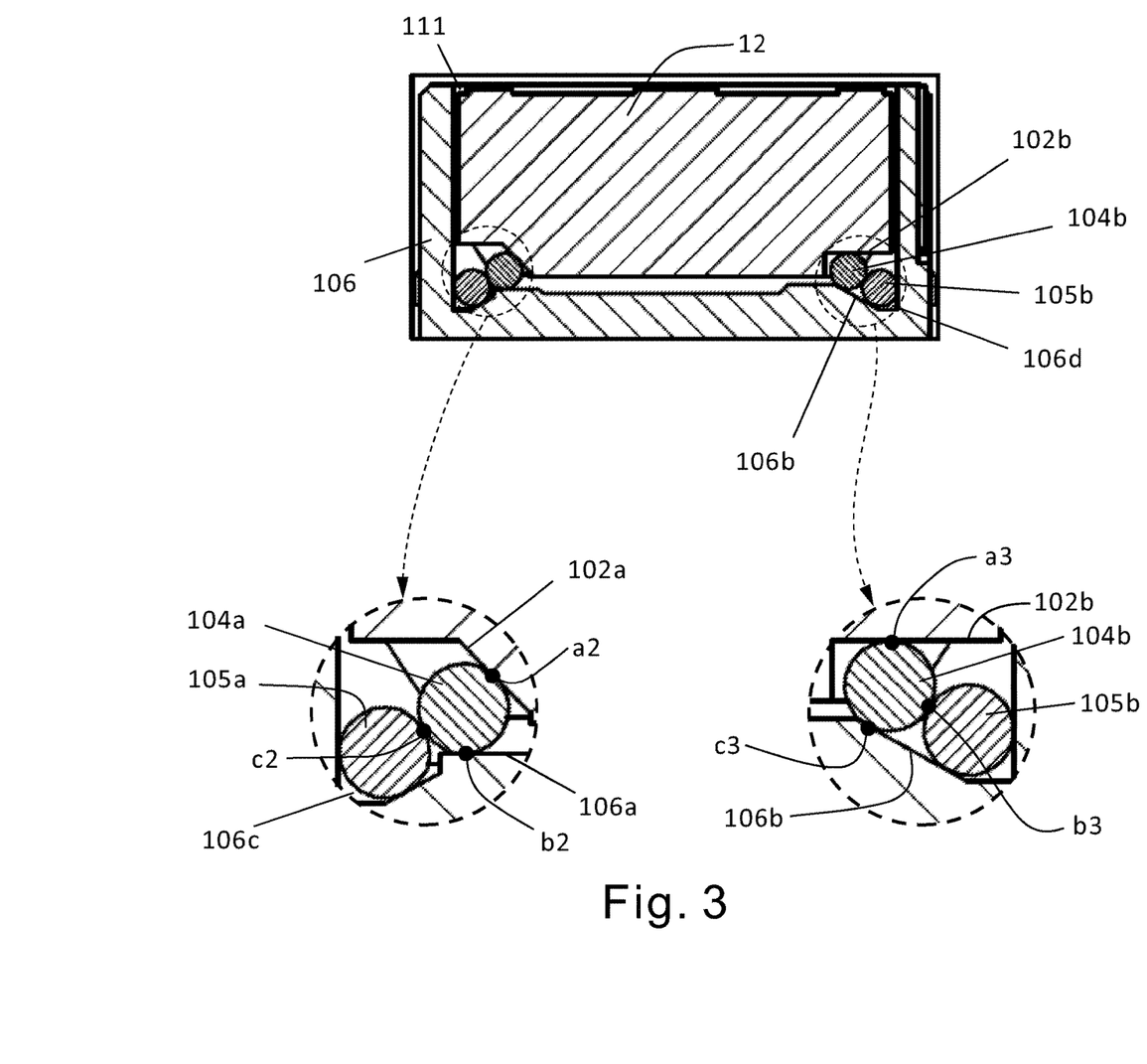
FIG. 3 is a schematic diagram showing the configuration between the rollable structure of FIGS. 2a and 2b and the base in the voice coil motor device.

In the embodiment, as shown in FIGS. 2a, 2b and 3, the base 106 has a first receiving slot 111 for receiving the movable magnetic path component 12; and two second receiving slots 106c, 106d for receiving the cylindrical guide rods 105a, 105b of the rollable structure, wherein the positions of the second receiving slots 106c, 106d are arranged to correspond to the abutting structures 102a, 106a and the abutting structures 102b, 106b on two side bottoms of the lens carrier 102 respectively, the abutting structures 102a, 106a have respective contact planes contacting the ball 104a, and the abutting structures 102b, 106b have respective contact planes contacting the ball 104b. There are abutting structures on the side bottom opposite to those on which the abutting structures 102a, 106a are located in the X/−X axial direction, wherein the configurations of the abutting structures on the opposite side bottom are the same as those of the abutting structures 102a, 106a; and there are abutting structures on the side bottom opposite to the side bottom on which the abutting structures 102b, 106b are located in the X/−X axial direction, wherein the configurations of the abutting structures on the opposite side bottom are the same as those of the abutting structures 102b, 106b. Thus, the movable magnetic path component 12, the base 106 and the rollable structure abut against each other and the movable magnetic path component 12 can be shifted on the mounting component 14.

As shown in FIG. 2b, there is a magnetic attraction force between the cylindrical guide rod 105a and the magnetic sensing element 103a; and there is a magnetic attraction force between the cylindrical guide rod 105b and the magnetic sensing element 103b. Under the actions of the magnetic attraction forces, the movable magnetic path component 12, the base 106 and the rollable structure abut against one another. For more clarity, by referring to FIG. 3, it can be seen that under the action of the magnetic attraction force, there are three point contacts between the ball 104a, and the abutting structure 102a, the abutting structure 106a and the cylindrical guide rod 105a. That is, the ball 104a is in a single-point contact a2 with the abutting structure 102a, the ball 104a is in a single-point contact b2 with the abutting structure 106a and the ball 104a is in a single-point contact c2 with the cylindrical guide rods 105a. After a current is applied to the set of coils 107a, 107b, the magnetic sensing elements 103a, 103b interact with the coils 107a, 107b such that a Lorentz Force is generated, which facilitates the movable magnetic path component 102 to move axially along the X/−X axial direction. During this process, owing to the three point contacts between the ball 104a, and the abutting structure 102a, the abutting structure 106a and the cylindrical guide rod 105a, the movable magnetic path component 12 can move under a minimum friction force.

In the embodiment of the voice coil motor device 1 as shown in FIGS. 1-3, the rollable structure is composed of the cylindrical guide rods 105a, 105b, the balls 104a-104d, the abutting structures 102a, 102b and the abutting structures 106a, 106b, wherein the balls 104a-104d are made of metal materials or non-metal materials, the cylindrical guide rods 105a, 105b are made of magnetically permeable materials, such that there is a respective magnetic attraction force between the cylindrical guide rods 105a, 105b and the magnetic sensing elements 103a, 103b.

The magnetically permeable materials in the present invention may be metals. When the material of which the cylindrical guide rods 105a, 105b are made is a metal, the surfaces of the cylindrical guide rods 105a, 105b must be straighter, such that there will be no bending of an optical path during the long-travel movement of the movable magnetic path component 12, and thus the movement travel of the movable magnetic path component 12 can be increased through the cylindrical guide rods 105a, 105b. In one embodiment, the movable magnetic path component 12 moving on a metal cylindrical guide rods 105a, 105b through the balls 104a~104d facilitates the movement of the movable magnetic path component 12 and the lens configured in the movable magnetic path component 12 to be up to 0.2 mm in the optical focusing operation and the movement of the movable magnetic path component 12 and the lens configured in the movable magnetic path component 12 to be up to 7 mm in the optical zooming operation, so that the optical focusing or zooming operations of the lens can be achieved.

The rollable structure has the same structure on two sides of the voice coil motor device 1 in the X/−X axial direction. As shown in the enlarged view of the part in the left dotted circle in FIG. 3, the abutting structure 102*a* on one side bottom of the movable magnetic path component 12 is an inclined opening, wherein the inclined opening of the abutting structure 102*a* has a contact plane in contact with the ball 104*a*; the abutting structure 106*a* is located on one side of the base 106, wherein the abutting structure 106*a* has a contact plane in contact with the ball 104*a*; each contact plane is in a single-point contact with the ball 104*a*; and the cylindrical guide rod 105*a* in the base 106 is in a single-point contact with the ball 104*a*. By referring to FIGS. 1*a* to 1*c* and 3, on the side opposite to the side of the voice coil motor device 1 on which the ball 104*a*, the abutting structure 102*a* and the abutting structure 106*a* are located (in the X/−X direction), there are a ball 104*c* (as shown in FIG. 1*c*), an abutting structure (not shown) having the same structure as that of the abutting structure 102*a*, and an abutting structure (not shown) having the same structure as that of the abutting structure 106*a*; and the configuration among the ball 104*c*, the two abutting structures and the cylindrical guide rod 105*a* on the opposite side is the same as that among the ball 104*a*, the abutting structure 102*a*, the abutting structure 106*a* and the cylindrical guide rod 105*a*. Because there is a Lorentz Force generated by the interaction between the magnetic sensing elements 103*a*, 103*b* and the set of coils 107*a*, 107*b*, facilitating the movable magnetic path component 102 to move along the X/−X axial direction, the movement paths of the balls 104*a*, 104*c* form respective contact lines on the cylindrical guide rod 105*a*. Thus, the cylindrical guide rod 105*a* in the base 106, on its two sides, has contact lines with the balls 104*a*, 104*c*. As shown in the enlarged view of the part in the left dotted circle in FIG. 3, the rollable structure is composed of, on its one side, the cylindrical guide rod 105*a*, the ball 104*a*, the abutting structure 102*a* having an inclined surface and the abutting structure 106*a*, wherein there is a contact point a2 between the contact plane of the abutting structure 102*a* and the ball 104*a*; there is a contact point b2 between the contact plane of the abutting structure 106*a* and the ball 104*a*; and there is a contact point c2 between the contact line of the cylindrical guide rod 105*a* and the ball 104*a*. The contact points a2, b2, c2 constitute three point contacts with the minimum moving friction force. Similarly, the operation of the rollable structure (i.e. the ball 104*c*, the two abutting structures (not shown) and the cylindrical guide rod 105*a*) on the opposite side is the same as that of the rollable structure (i.e. the ball 104*a*, the abutting structure 102*a*, the abutting structure 106*a* and the cylindrical guide rod 105*a*). As shown in the enlarged view of the part in the left dotted circle in FIG. 3, the ball 104*a* is arranged among the contact plane of the abutting structures 102*a*, the contact plane of the abutting structure 106*a* of the base 106, and the contact line of the cylindrical guide rod 105*a* in the base 106. In this way, the friction force between the movable magnetic path component 12 and the base 106 will be minimized, thereby facilitating the movable magnetic path component 12 to move in the first receiving 111 and thus achieving the auto focusing or zooming of the lens.

In a further embodiment as shown in the enlarged view of the part in the right dotted circle in FIG. 3, the abutting structure 102*b* on one side bottom of the movable magnetic path component 12 is a plane opening, wherein the plane opening of the abutting structure 102*b* has a contact plane in contact with the ball 104*b*; the abutting structure 106*b* is located on one side of the base 106, wherein the abutting structure 106*b* has a contact plane in contact with the ball 104*b*; each contact plane is in a single-point contact with the ball 104*b*; and the cylindrical guide rod 105*b* in the base 106 is in a single-point contact with the ball 104*b*. By referring to FIGS. 1*a* to 1*c* and 3, on the side opposite to the side of the voice coil motor device 1 on which the ball 104*b*, the abutting structure 102*b* and the abutting structure 106*b* are located (in the X/−X direction), there are a ball 104*d* (as shown in FIG. 1*c*), an abutting structure (not shown) having the same structure as that of the abutting structure 102*b*, and an abutting structure (not shown) having the same configuration as that of the abutting structure 106*b*; and the configuration among the ball 104*d*, the two abutting structures and the cylindrical guide rod 105*b* on the opposite side is the same as that among the ball 104*b*, the abutting structure 102*b*, the abutting structure 106*b* and the cylindrical guide rod 105*b*. Because of the Lorentz Force generated by the interaction between the magnetic sensing elements 103*a*, 103*b* and the set of coils 107*a*, 107*b*, facilitating the movable magnetic path component 102 to move along the X/−X axial direction, the movement paths of the balls 104*b*, 104*d* forms respective contact lines on the cylindrical guide rod 105*b*. As shown in the enlarged view of the part in the right dotted circle in FIG. 3, the rollable structure is composed of, on its another side, the cylindrical guide rod 105*b*, the ball 104*b*, the abutting structure 102*b* having a plane surface and the abutting structure 106*b*, wherein there is a contact point a3 between the contact plane of the abutting structure 102*b* and the ball 104*b*; there is a contact point b3 between the contact line of the cylindrical guide rod 105*b* and the ball 104*b*; and there is a contact point c3 between the contact plane of the abutting structure 106*b* and the ball 104*b*. The contact points a3, b3, c3 constitute three point contacts with the minimum moving friction force. Similarly, the operation of the rollable structure (i.e. the ball 104*d*, the two abutting structures (not shown) and the cylindrical guide rod 105*b*) on the opposite side is the same as that of the rollable structure (i.e. the ball 104*b*, the abutting structure 102*b*, the abutting structure 106*b* and the cylindrical guide rod 105*b*). Thus, the cylindrical guide rod 105*b* in the base 106, on its two sides, has respective contact lines contacting the balls 104*b*, 104*d*. As shown in the enlarged view of the part in the right dotted circle in FIG. 3, the ball 104*b* is arranged among the contact plane of the abutting structures 102*b*, the contact plane of the abutting structure 106*b* of the base 106, and the contact line of the cylindrical guide rod 105*b* in the base 106. In this way, the friction force between the movable magnetic path component 12 and the base 106 will be minimized, thereby facilitating the movable magnetic path component 12 to move in the first receiving 111 and thus achieving the auto focusing or zooming of the lens. Therefore, two contact lines respectively along the two sides of the base 106 are formed by the contact lines of the cylindrical guide rod 105*a* contacting the balls 104*a*, 104*c* and the contact lines of the cylindrical guide rod 105*b* contacting the balls 104*b*, 104*d*.

Figure 4:
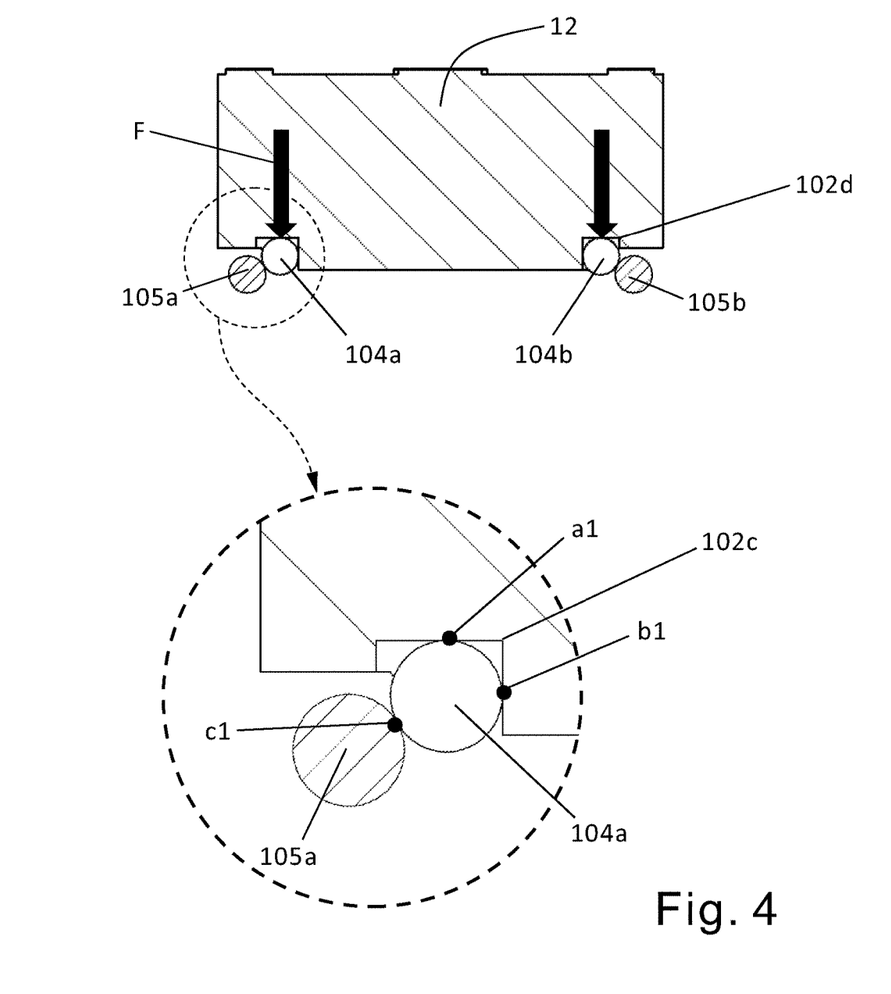
FIG. 4 is a schematic diagram showing a further embodiment of the voice coil motor device according to the present invention, in which the configuration of the rollable structure is shown.

FIG. 4 is a schematic diagram showing an additional embodiment of the voice coil motor device 1 according to the present invention, in which the configuration of the rollable structure is shown. In this embodiment, the rollable structure has the same configuration on four sides of the voice coil motor device 1. As shown in FIG. 4, an abutting structure 102*c* and an abutting structure 102*d* are arranged on the two side bottoms of the movable magnetic path component 12, respectively, wherein each of the abutting structure 102*c* and the abutting structure 102*d* is an opening formed by two contact planes with an included angle therebetween, the contact planes contact the balls 104*a*, 104*b*, wherein the ball 104a is in a single point contact with each of the two contact planes of the abutting structure 102c, and the ball 104b is in a single point contact with each of the two contact planes of the abutting structure 102d, such that the ball 104a has two point contacts with the opening of the abutting structure 102c, and the ball 104b has two point contacts with the opening of the abutting structure 102d; and the cylindrical guide rod 105a in the base 106 is in a single point contact with the ball 104a, and the cylindrical guide rod 105b in the base 106 is in a single point contact with the ball 104b. By referring to FIGS. 1a to 1c and 4, on the side opposite to the side of the voice coil motor device 1 on which the ball 104a and the abutting structure 102c are located (in the X/−X direction), there are a ball 104c (as shown in FIG. 1c), an abutting structure (not shown) having the same structure as that of the abutting structure 102c, wherein the configuration among the ball 104c, the abutting structure and the cylindrical guide rod 105a on the opposite side is the same as that among the ball 104a and the abutting structure 102c and the cylindrical guide rod 105a; on the side opposite to the side of the voice coil motor device 1 on which the ball 104b and the abutting structure 102d are located (in the X/−X direction), there are a ball 104d (as shown in FIG. 1c), an abutting structure (not shown) having the same structure as that of the abutting structure 102d, wherein the configuration among the ball 104d, the abutting structure and the cylindrical guide rod 105b on the opposite side is the same as that among the ball 104b and the abutting structure 102d and the cylindrical guide rod 105b. In the embodiment of FIG. 4, owing to the Lorentz Force, facilitating the movable magnetic path component 102 to move along the X/−X axial direction, the movement paths of the balls 104a, 104c form respective contact lines on the cylindrical guide rod 105a; and the movement paths of the balls 104b, 104d form respective contact lines on the cylindrical guide rod 105b. Thus, the contact lines on the cylindrical guide rod 105a in the base 106, on its two sides, contacting with the balls 104a, 104c and the contact lines on the cylindrical guide rod 105b in the base 106, on its two sides, contacting with the balls 104b, 104d form two contact lines respectively along the two sides of the base 106. Thus, as shown in FIG. 4, the rollable structure is composed of the cylindrical guide rods 105a, 105b, the balls 104a, 104b, 104c, 104d, the abutting structure 102c, the abutting structure on the side opposite to the side of the voice coil motor device 1 on which the ball 104a and the abutting structure 102c are located, the abutting structures 102d and the abutting structure on the side opposite to the side of the voice coil motor device 1 on which the ball 104b and the abutting structure 102d are located. For example, in the enlarged view of the part in the dotted circle in FIG. 4, there are a contact point a1 between one of the two contact planes of the abutting structure 102c and the ball 104a, and a contact point b1 between the other of the two contact planes of the abutting structure 102c and the ball 104a; and there is a contact point c1 between the contact line of the cylindrical guide rod 105a and the ball 104a. The contact points a1, b1, c1 constitute three point contacts with the minimum friction force when the movable magnetic path component 12 moves. In the embodiment of FIG. 4, the ball 104a is arranged among the two contact planes of the abutting structure 102c and the contact line of the cylindrical guide rod 105a in the base 106, and the ball 104b is arranged among the two contact planes of the abutting structure 102d and the contact line of the cylindrical guide rod 105b in the base 106. In this way, the friction force between the movable magnetic path component 12 and the base 106 will be minimized, thereby facilitating the movable magnetic path component 12 to move in the first receiving 111 and thus achieving the auto focusing or zooming of the lens.

Figure 5:
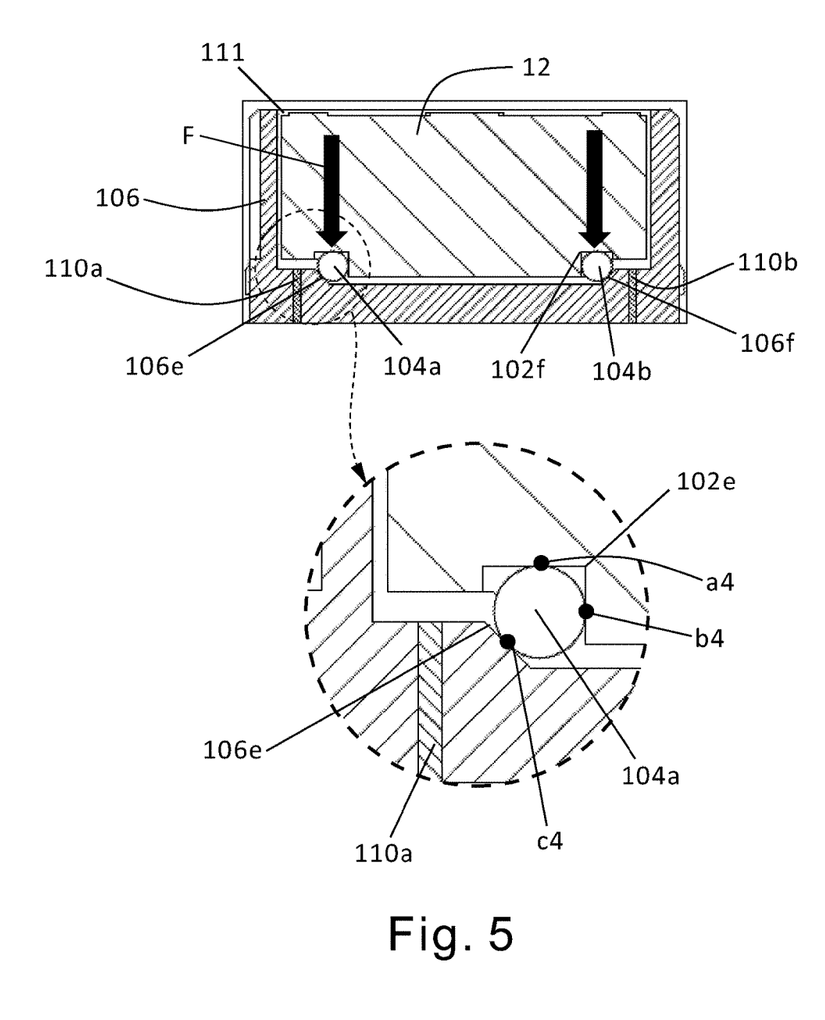
FIG. 5 is a schematic diagram showing a further embodiment of the voice coil motor device according to the present invention, in which the configuration between the rollable structure and the base is shown.

FIG. 5 is a schematic diagram showing a further embodiment of the voice coil motor device 1 according to the present invention, in which the configuration between the rollable structure and the base 106 is shown. As shown in FIG. 5, there are an abutting structure 102e and an abutting structure 102f on the two side bottoms of the movable magnetic path component 12, wherein each of the abutting structure 102e and the abutting structure 102f is an opening formed by two contact planes with an included angle therebetween, each contact plane of the abutting structure 102e is in a single point contact with the ball 104a, and each contact plane of the abutting structure 102f is in a single point contact with the ball 104b; and there are an inclined-surface abutting structure 106e and an inclined-surface abutting structure 106f on two sides of the base 106, wherein the inclined-surface abutting structure 106e has a contact plane contacting the ball 104a, and the inclined-surface abutting structure 106f has a contact plane contacting the ball 104b. In this embodiment, the movement paths of the balls 104a, 104c form respective contact lines on the inclined-surface abutting structure 106e; and the movement paths of the balls 104b, 104d form respective contact lines on the inclined-surface abutting structure 106f. Thus, the contact planes of the abutting structure 106e and the contact planes of the abutting structure (not shown) on the opposite side of the base 106 (in the X/−X axial direction) have respective contact lines with the ball 104a and the ball 104c (referring to FIG. 1c); and the contact planes of the abutting structure 106f and the contact planes of the abutting structure (not shown) on the opposite side of the base 106 (in the X/−X axial direction) have respective contact lines with the ball 104b and the ball 104d (referring to FIG. 1c). Thus, in the embodiment of FIG. 5 and also referring to FIG. 1c, the rollable structure is composed of the balls 104a, 104b, 104c, 104d, the abutting structures 102e, 106e and the abutting structures on the side opposite to the side of the voice coil motor device 1 on which the ball 104a is located, and the abutting structures 102f, 106f and the abutting structures at the side opposite to the side of the voice coil motor device 1 at which the ball 104b is located. For example, in the enlarged view of the part in the dotted circle in FIG. 5, there are a contact point a4 between one of the two contact planes of the abutting structure 102e and the ball 104a, and a contact point b4 between the other of the two contact planes of the abutting structure 102e and the ball 104a; and there is a contact point c4 between the contact plane of the abutting structure 106e and the ball 104a. The contact points a4, b4, c4 constitute three point contacts with the minimum friction force when the movable magnetic path component 12 moves. In the embodiment of FIG. 5, the ball 104a is arranged among the two contact planes of the abutting structure 102e and the contact line of the contact plane of the abutting structure 106e, and the ball 104b is arranged among the two contact planes of the abutting structure 102f and the contact line of the contact plane the abutting structure 106f. In this way, the friction force between the movable magnetic path component 12 and the base 106 will be minimized, thereby facilitating the movable magnetic path component 12 to move in the first receiving 111 and thus achieving the auto focusing or zooming of the lens.

As shown in FIG. 5 and also referring to FIG. 1c, the rollable structure is composed of balls 104a, 104b, 104c, 104d, abutting structures 102e, 102f and two abutting structures respectively corresponding thereto (not shown) at the opposite sides, and abutting structures 106e, 106f and two abutting structures respectively corresponding thereto (not shown) at the opposite sites. In this embodiment, the cylindrical guide rods 105a, 105b in FIGS. 1-5 are replaced by magnets 110a, 110b. There is a magnetic attraction force between the magnetic sensing elements 103a, 103b and the magnets 110a, 110b. Under the magnetic attraction force, the movable magnetic path component 12, the base 106 and the rollable structure abut against one another.

Figure 6:
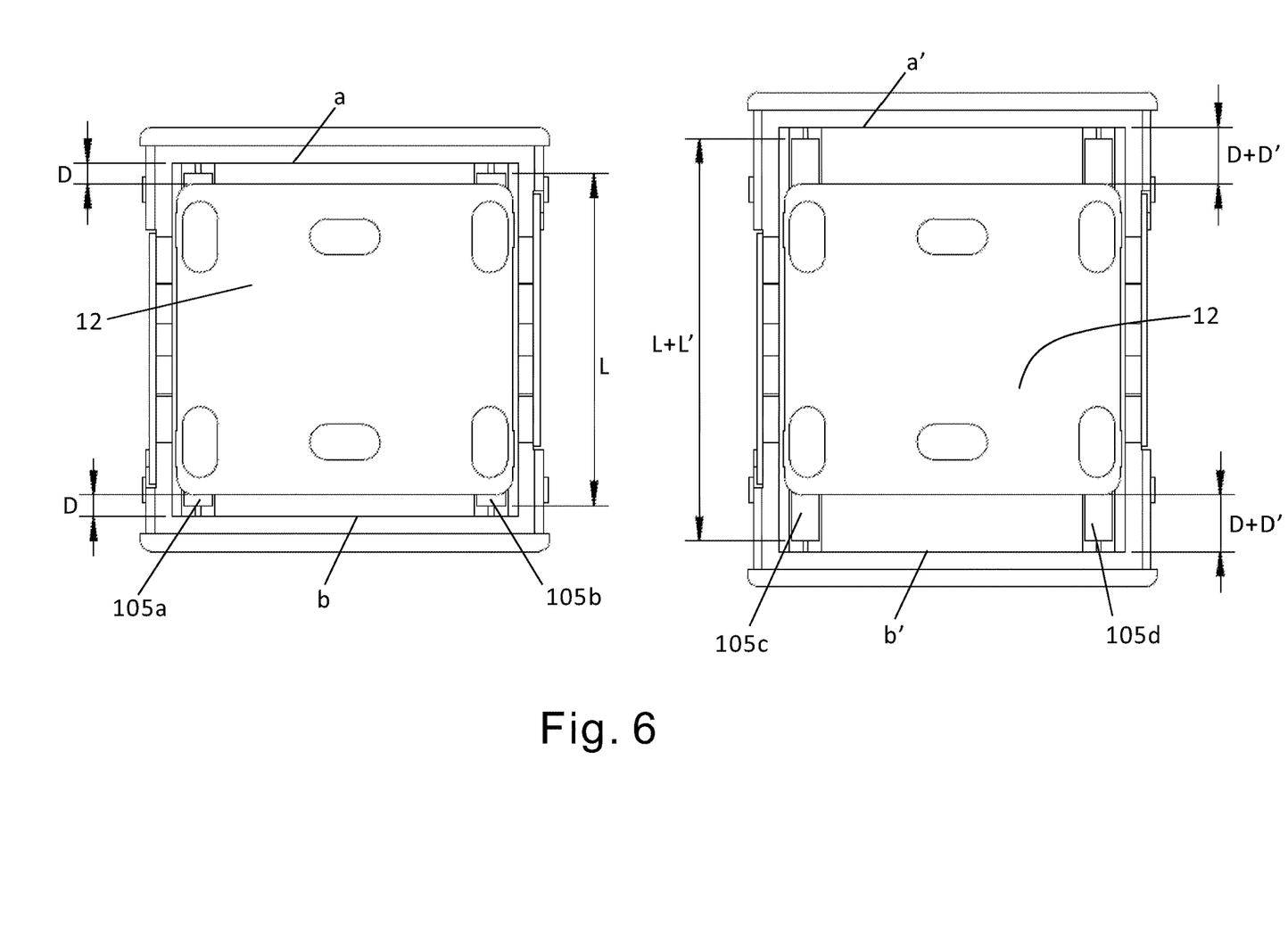
FIG. 6 is a schematic diagram of a voice coil motor for auto focusing or zooming according to the present invention, in which the movement of the movable magnetic path component is shown.

FIG. 6 is a schematic diagram of a voice coil motor for auto focusing or zooming according to the present invention, in which the moving travel of the movable magnetic path component 12 is shown. As shown in FIG. 6, when the length of each of the cylindrical guide rods 105a, 105d is L, the maximum moving travel of the movable magnetic path component 12 is D (the maximum moving distance in one direction). That is, the movement of the movable magnetic path component 12 will stop, when the movable magnetic path component 12 touches the limit boundary during its movement. When the length of the cylindrical guide rods 105c, 105d changes from L to L+L', the maximum travel of the movable magnetic path component 12 becomes D+D' under the condition that the size of the movable magnetic path component 12 is constant.

Figure 7:
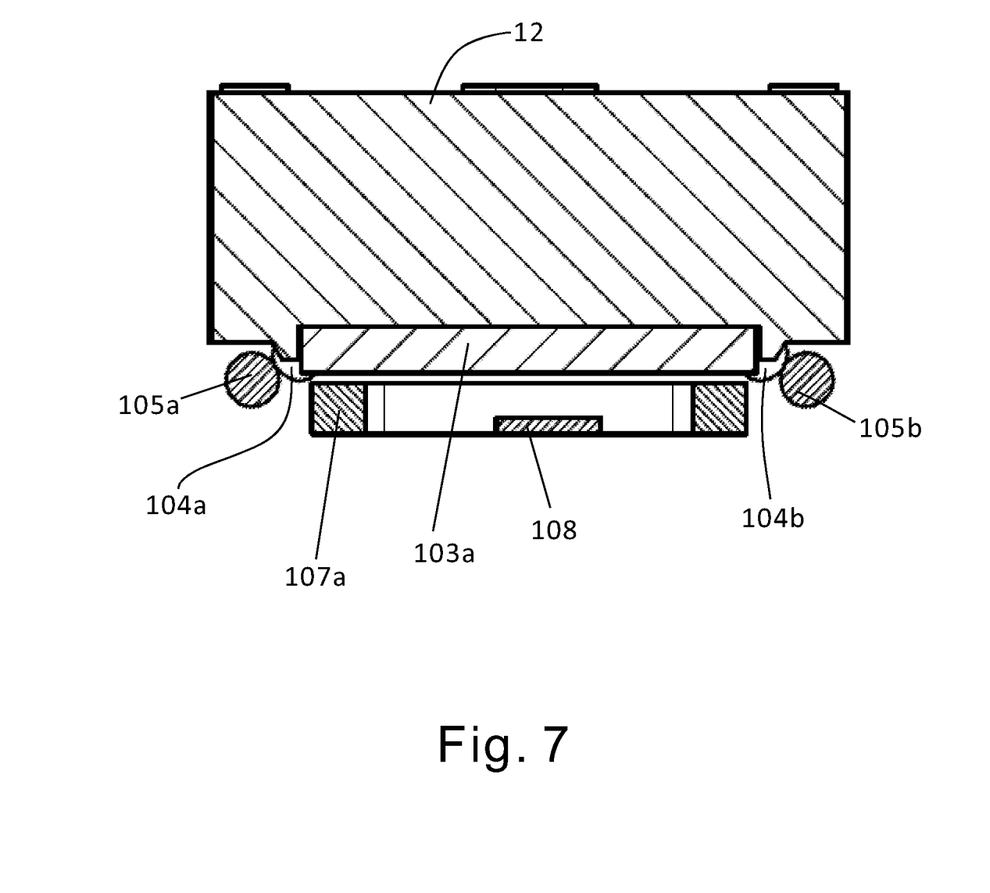
FIG. 7 is a schematic diagram of the voice coil motor for auto focusing or zooming according to the present invention.

FIG. 7 is a schematic diagram of the voice coil motor for auto focusing or zooming according to the present invention. As shown in FIG. 7, the configuration of two voice coil motors arranged on the elevations of the base can be changed as the configuration of only one voice coil motor located below the movable magnetic circuit component 12.

It is contemplated that modifications and combinations will readily occur to one ordinarily skilled in the art, and these modifications and combinations are within the scope of this invention.

EMBODIMENTS

1. A voice coil motor device for auto focusing or zooming, includes: a base having a first receiving slot and two second receiving slots; a movable magnetic path component configured in the first receiving slot and having a lens carrier installing thereon a lens, wherein the lens carrier has a bottom surface having a plurality of first abutting structures; two elongate guide rods mounted in the two second receiving slots respectively; and a plurality of balls respectively mounted between the plurality of first abutting structures and the two guide rods, wherein the plurality of balls facilitate a movement of the movable magnetic path component in the first receiving slot, for performing an auto focusing or zooming of the lens.
2. The voice coil motor device according to Embodiment 1, wherein the movable magnetic path component further comprises magnetic sensing elements configured on both sides of the lens carrier.
3. The voice coil motor device according to Embodiment 1 or 2, wherein the base further includes a set of coils.
4. The voice coil motor device according to any one of Embodiments 1-3, wherein each of the magnetic sensing elements is at a predetermined distance from a respective coil of the set of coils.
5. The voice coil motor device according to any one of Embodiments 1-4, wherein the plurality of first abutting structures is a plurality of openings with each opening formed by two planes with an included angle therebetween, a plurality of inclined-surface openings, or a combination thereof.
6. The voice coil motor device according to any one of Embodiments 1-5, wherein on a condition that the plurality of first abutting structures are the plurality of openings with each opening formed by the two planes with the included angle, each ball has two point contacts with each opening formed by the two planes with the included angle and each ball has one point contact with each respective elongate guide rod so as to reduce a friction between the movable magnetic path component and the base.
7. The voice coil motor device according to any one of Embodiments 1-6, wherein the base further comprises a plurality of second abutting structures.
8. The voice coil motor device according to any one of Embodiments 1-7, wherein on a condition that the plurality of first abutting structures are the plurality of inclined-surface openings, each ball has a point contact with each respective inclined-surface opening, each ball has a point contact with each respective second abutting structure, and each ball has a point contact with each respective elongate guide rod so as to reduce a friction between the movable magnetic path component and the base.
9. The voice coil motor device according to any one of Embodiments 1-8, wherein the two elongate guide rods are cylindrical and made of a magnetically permeable material, and there is a magnetic attraction force between the two elongate guide rods and the magnetic sensing elements, so that the base, the movable magnetic path component, the two elongate guide rods and the plurality of balls abut against one another.
10. The voice coil motor device according to any one of Embodiments 1-9, wherein the magnetically permeable material is a metal to increase a movement travel of the movable magnetic path component.
11. A voice coil motor device, includes: a base having a first receiving slot, two sides and two contact lines respectively along the two sides; a carrying structure configured in the first receiving slot, carrying a lens and having two side bottoms, wherein each the side bottom has a first contact plane; two second contact planes configured on the two sides or the two side bottoms respectively; and four balls each configured among the respective contact line, the respective side bottom and the two second contact planes, so that each ball has a respective single-point contact with any of the respective contact line, the first contact plane and the two second contact planes, and the carrying structure moves in the first receiving slot via the four balls, for facilitating an auto focusing or zooming of the lens.
12. The voice coil motor according to Embodiment 11, wherein the carrying structure has two magnetic sensing elements configured on two sidewalls of the carrying structure respectively.
13. The voice coil motor according to Embodiment 11 or 12, further includes two cylindrical guide rods on two sides of a space defined between the base and the carrying structure.
14. The voice coil motor according to any one of Embodiments 11-13, wherein the contact lines are formed on the two cylindrical guide rods respectively.
15. The voice coil motor according to any one of Embodiments 11-14, wherein on a condition that the two second contact planes are configured on the two side bottoms, the first contact plane is adjacent and connected to the second contact plane, and there is a magnetic attraction force between the corresponding cylindrical guide rod and magnetic sensing element, so that the base, the carrying structure and the four balls abut against one another.

16. The voice coil motor according to any one of Embodiments 11-15, wherein the two cylindrical guide rods are made of a magnetically permeable material.

17. The voice coil motor according to any one of Embodiments 11-16, wherein the magnetically permeable material is a metal to increase a movement travel of the carrying structure.

18. The voice coil motor according to any one of Embodiments 11-17, wherein the two second contact planes are formed on the two sides of the base.

19. The voice coil motor according to any one of Embodiments 11-18, wherein the base further includes a set of coils.

20. The voice coil motor according to any one of Embodiments 11-19, wherein each magnetic sensing element is at a predetermined distance from a respective coil of the set of coils.

What is claimed is:

1. A voice coil motor device for auto focusing or zooming, comprising:
    a base having a first receiving slot and two second receiving slots;
    a movable magnetic path component configured in the first receiving slot and having a lens carrier installing thereon a lens, wherein the lens carrier has a bottom surface having a plurality of first abutting structures;
    two elongate guide rods mounted in the two second receiving slots respectively; and
    a plurality of balls respectively mounted between the plurality of first abutting structures and the two elongate guide rods, wherein the plurality of balls facilitate a movement of the movable magnetic path component in the first receiving slot, for performing an autofocusing or zooming of the lens,
    wherein on a condition that the plurality of first abutting structures is a of openings with each opening formed by the two planes with the included angle, each ball has two point contacts with each opening formed by the two planes with the included angle and each ball has one point contact with each respective elongate guide rod so as to reduce a friction between the movable magnetic path component and the base.

2. The voice coil motor device according to claim 1, wherein the movable magnetic path component further comprises magnetic sensing elements configured on both sides of the lens carrier.

3. The voice coil motor device according to claim 2, wherein the base further includes a set of coils.

4. The voice coil motor device according to claim 3, wherein each of the magnetic sensing elements is at a predetermined distance from a respective coil of the set of coils.

5. A voice coil motor device for auto focusing or zooming, comprising:
    a base having a first receiving slot and two second receiving slots;
    a movable magnetic path component configured in the first receiving slot and having a lens carrier installing thereon a lens, wherein the lens carrier has a bottom surface having a plurality of first abutting structures;
    two elongate guide rods mounted in the two second receiving slots respectively; and a plurality of balls respectively mounted between the plurality of first abutting structures and the two elongate guide rods, wherein the plurality of balls facilitate a movement of the movable magnetic path component in the first receiving slot, for performing an autofocusing or zooming of the lens, wherein the base further comprises a plurality of second abutting structures, the movable magnetic path component further comprises magnetic sensing elements configured on both sides of the lens carrier, on a condition that the plurality of first abutting structures is a plurality of inclined-surface openings, each ball has a point contact with each respective inclined-surface opening, each ball has a point contact with each respective second abutting structure, and each ball has a point contact with each respective elongate guide rod so as to reduce a friction between the movable magnetic path component and the base.

6. The voice coil motor device according to claim 5, wherein the two elongate guide rods are cylindrical and made of a magnetically permeable material, and there is a magnetic attraction force between the two elongate guide rods and the magnetic sensing elements, so that the base, the movable magnetic path component, the two elongate guide rods and the plurality of balls abut against one another.

7. The voice coil motor device according to claim 6, wherein the magnetically permeable material is a metal to increase a movement travel of the movable magnetic path component.

* * * * *